United States Patent [19]
Ohki et al.

[11] Patent Number: 5,311,367
[45] Date of Patent: May 10, 1994

[54] OPTICAL DEVICE INCLUDING A TRANSPARENT MATERIAL BETWEEN TWO RELATIVELY ADJUSTABLE TRANSPARENT MEMBERS

[75] Inventors: Kazuhiro Ohki; Shoichi Shimura, both of Yokohama; Naoki Kobayashi, Tokyo, all of Japan

[73] Assignee: Canon Kabushiki Kaisha, Tokyo, Japan

[21] Appl. No.: 96,840

[22] Filed: Jul. 26, 1993

Related U.S. Application Data

[63] Continuation of Ser. No. 683,886, Apr. 11, 1991, abandoned.

[30] Foreign Application Priority Data

Apr. 12, 1990 [JP] Japan ................ 2-97271

[51] Int. Cl.⁵ .............. G02B 5/06; G02B 27/64
[52] U.S. Cl. .................... 359/832; 359/557
[58] Field of Search .......... 350/286, 287, 500; 359/832, 831, 554, 557

[56] References Cited

U.S. PATENT DOCUMENTS

| | | | |
|---|---|---|---|
| 3,337,287 | 8/1967 | Lessman | 350/286 |
| 3,503,663 | 3/1970 | de la Cierva | 350/500 |
| 3,514,192 | 5/1970 | de la Cierva et al. | 350/286 |
| 4,614,405 | 9/1986 | Brandenberg et al. | 350/286 |
| 4,666,299 | 5/1987 | Tamaki et al. | 350/286 |
| 4,822,138 | 4/1989 | Takase | 350/252 |
| 4,844,602 | 7/1989 | Kitagishi et al. | 350/500 |
| 4,913,528 | 4/1990 | Hasegawa . | |

FOREIGN PATENT DOCUMENTS

| | | | |
|---|---|---|---|
| 60-176017 | 9/1985 | Japan | 350/286 |
| 62-153816 | 7/1987 | Japan | 350/500 |

*Primary Examiner*—Jon W. Henry
*Attorney, Agent, or Firm*—Fitzpatrick, Cella, Harper & Scinto

[57] ABSTRACT

An optical device for stabilizing an image of an objective lens against an unexpected vibration is disclosed. A pair of transparent parallel-plane plates are supported by a support member, an optically transparent material is held in a space defined by the pair of parallel-plane plates by a deformable connecting member, a reinforcement member made of a harder material than that of the support material is provided at a portion of the support member, and a drive force is applied to the pair of parallel-plane plates through the reinforcement member.

15 Claims, 5 Drawing Sheets

OPTICAL DEVICE INCLUDING A TRANSPARENT MATERIAL BETWEEN TWO RELATIVELY ADJUSTABLE TRANSPARENT MEMBERS

This application is a continuation of application Ser. No. 07/683,886 filed Apr. 11, 1991 now abandoned.

BACKGROUND OF THE INVENTION

1. Field of the Invention

The present invention relates to an optical device for varying an optical performance of a passing light beam by varying a relative angle of a pair of transparent parallel-plane plate having an optically transparent material filled therein, and that is suitable for use in an image stabilizing optical device, which is arranged in an imaging system of a photographic camera or a video camera to compensate for a vibration of an image due to a vibration of the imaging system.

2. Related Background Art

An optical device in which an optically transparent material, such as a liquid or a silicon rubber, is filled between a pair of transparent parallel-plane plates to form a variable apex angle prism, where an angle (parallelism) between the pair of parallel-plane plates is varied by an external drive force to vary an optical performance of a passing light beam has been proposed in the art.

FIG. 5 shows a known optical device.

The optical device shown in FIG. 5 has two transparent parallel-plane plates 201 arranged to face each other.

The pair of parallel-plane plates 201 are supported by a ring-shaped support member 204 having an L-shaped cross-section. Peripheries of the parallel-plane plates 201 are held by a flexible ring-shaped connecting member 202 which is thermal-bonded to the support member 204, and a transparent material 203 such as silicon rubber or liquid is filled therein.

The optical device forms a variable apex angle prism whose apex angle is variable by varying the angle between the two parallel-plane plates 201 by the drive force from the external drive means 205, to deflect an incident light beam h by a desired angle.

In the prior art optical device, a material which is easily thermal-bonded to the connecting member such as a relatively soft material is selected as the support member, and the drive force is applied to the support member to vary the apex angle of the prism formed by the two parallel-plane plates.

As a result, a response of inclination of the parallel-plane plates when the drive force is applied to the support member by the drive means is slow, and it is difficult to quickly vary the apex angle of the variable apex angle prism formed by the pair of parallel-plane prism. Accordingly, the tracking ability to stabilize the image against the vibration of the camera is poor.

SUMMARY OF THE INVENTION

It is a first object of the present invention to provide a variable apex angle prism having a good tracking ability.

It is a second object of the present invention to provide a high response optical device which can quickly and easily vary or apex angle of a variable apex angle prism formed by a pair of parallel-plane plates by an appropriate reinforcement member provided at a portion of a support member which supports the parallel-plane plates.

DETAILED DESCRIPTION OF THE PREFERRED EMBODIMENTS

Figure 1:
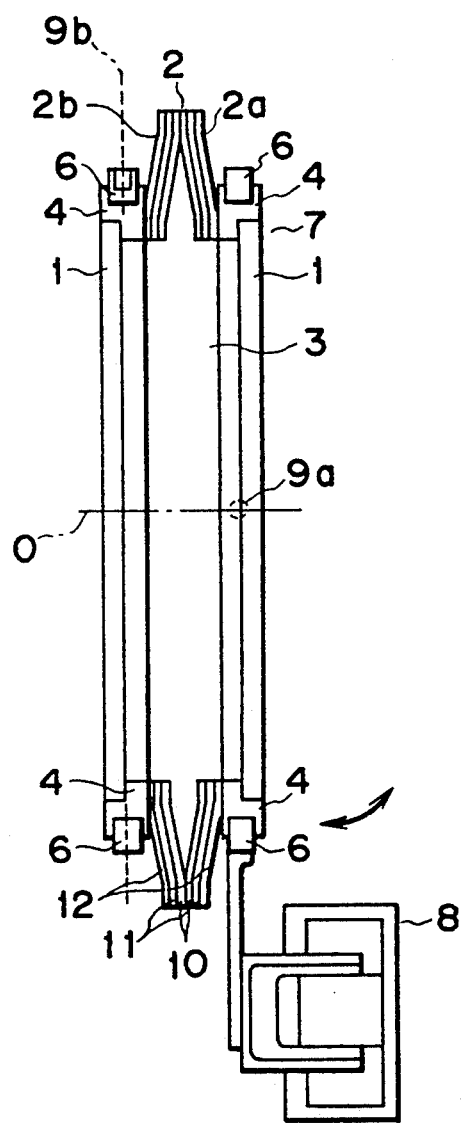
FIGS. 1, 2 and 3 show sectional views of major portions of first, second and third embodiments of the present invention, respectively.

FIG. 1 shows a sectional view of major portions of a first embodiment of the present invention. An objective lens is arranged rightward of the drawing although it is not shown.

In FIG. 1, numeral 1 denotes a pair of optically transparent disk-shaped parallel-plane plates which may be glass plates or plastic plates and which form a variable apex angle prism. Numeral 4 denotes a ring-shaped support member which surrounds and supports the parallel-plane plates 1. Numeral 2 denotes a ring-shaped flexible connecting member, which comprises two deformable high molecule film members 2a and 2b. The connecting member 2 and the support member 4 are thermally bonded. Numeral 3 denotes an optically transparent deformable material. The material 3 is filled in a space defined by the parallel-plane plates 1 and the connecting member 2. Numeral 6 denotes a reinforcement member, which is made of a harder material than the support member 4 so that there is no response delay when the variable apex angle prism is driven. The reinforcement member 6 is of ring-shape and inserted in a U-shape at a periphery of the support member 4. An end plane of the reinforcement member 6 is positioned in an outer periphery than the support member 4.

In the present embodiment, the reinforcement member 6 and the support member 4 form a composite member 7.

Numeral 8 denotes drive means. A portion thereof is connected to the reinforcement member 6 to apply a drive force to the pair of parallel-plane plates through the reinforcement member 6. The left hand plane 1 is driven by drive means (not shown), which is positioned at a 90° rotated position of the drive means 8 with respect to an optical axis. In the manner, the connecting member 2 is expanded and contracted to vary the apex angle of the variable apex angle prism formed by the pair of parallel plane plates. An arrow shows a direction of rotation of the right hand parallel-plane plate. Numeral 9a denotes a rotation axis of the right hand parallel-plane plate, and numeral 9b denotes a rotation axis of the left hand parallel-plane plate.

Each of the two members 2a and 2b of the connecting member 2 is formed by two thin high molecule films. Each of the two members 2a and 2b is a thin laminated three-layer film which comprises a film thermal bonding layer 10 for thermally bonding the high molecule films, a barrier layer 11 for protecting the material 3 from external moisture gas and a mold thermal bonding layer 12 which is thermal bonded to the support member 6.

In the present embodiment, the material 3 may be liquid such as water, alcohol, glycol, silicon oil, or modified silicon oil, or an elastic material such as silicon rubber.

The material of the thermal bonding layer 12 of the connecting member 2 is preferably a high thermal bonding strength material such as low density polyethylene, linear low density polyethylene, high density polyethylene, medium density polyethylene, polypropylene, polyamid and polyester, and the material of the support member 4 is preferably a material of the same type having a high thermal bonding strength. The reinforcement member 6 is made of a material which is harder than the support member 4 and does not cause a response delay when the variable apex angle prism is driven, preferably it is a metal material such as aluminum, stainless steel, copper or zinc, or a resin material such as polyethylene, polypropylene, polymethyl benten-l, polystyrene, ABS resin, PMMA, polycarbonate, polyoxymethylene, polyamide, polyethylene telephthalate, polybutylene telephthalate, polyphenylene sulfite, polyallylate, polysulphone, polyether sufphone, polyetherimid, polyether etherketon or aromatic liquid crystal polyester, and when necessary, reinforcing fibers such as glass or carbon fibers or inorganic particles such as silica may be added. The composite material, which comprises the support member 4 and the reinforcement member 6, may be manufactured by an insert molding method in which the reinforcement member 6 formed by injection molding is inserted, a dichromatic molding method in which both members are simultaneously molded or a bonding method. Material, shape and manufacturing cost are taken into consideration to select an optimum method.

In the present embodiment, the thermal bonding layers 10 and 12 which forms the members 2a and 2b of the connecting member 2 are made of linear low density polyethylene, which assures a high thermal bonding strength, and the support member 4 is made of the same material to attain the high bonding strength. The reinforcement member 6 is made of glass fiber added polyethylene telephthalate and it is composited into the shape shown in FIG. 1 by the insert molding. A portion of the drive means 8 is fixed to an end plane of the composite material 7 by a hole or a screw, and holding rotating angles 9a and 9b for the variable apex angle prism are held thereby.

Figure 4:
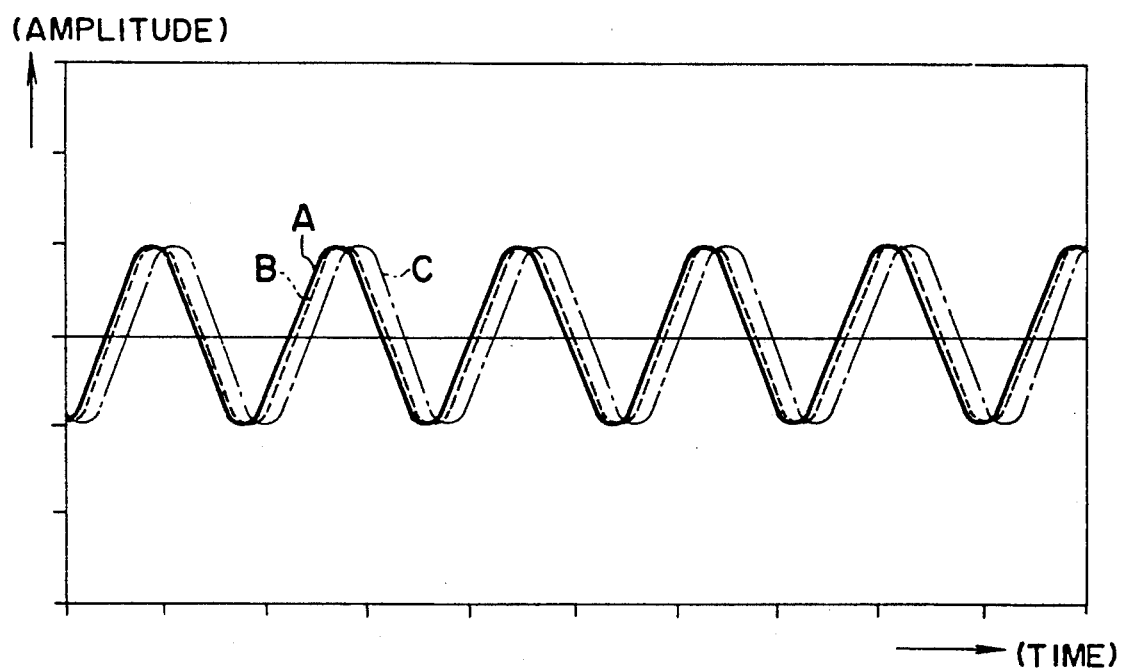
FIG. 4 illustrates a response of a variable apex angle prism by a difference of material of composite material.
Figure 5:
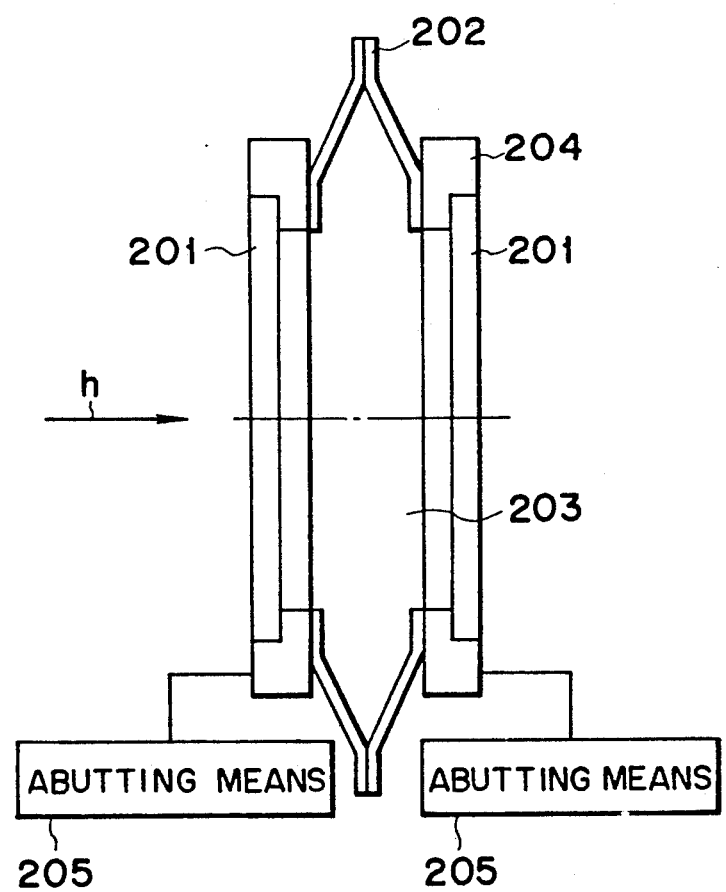
FIG. 5 shows a prior art optical device.

FIG. 4 illustrates a response of the variable apex angle prism.

A curve A shows a response when the material of the reinforcement member 6 is polyethylene telephathalate having aluminum and glass fibers added thereto, a curve B shows a response when it is high density polyethylene, and a curve C shows when it is low density polyethylene.

The harder the reinforcement member 6 is, the smaller is the delay of response, and when the hardness is higher than a threshold, the delay of response is substantially zero. In the present embodiment, the glass fiber added polyethylene telephthalate has substantially zero delay of response. The response also depends on the composite shape, a maximum correction frequency, a size of the variable apex angle prism, a drive control method, and a holding method, and an optimum composite shape and an optimum material hardness may be selected depending on the specification.

Figure 2:
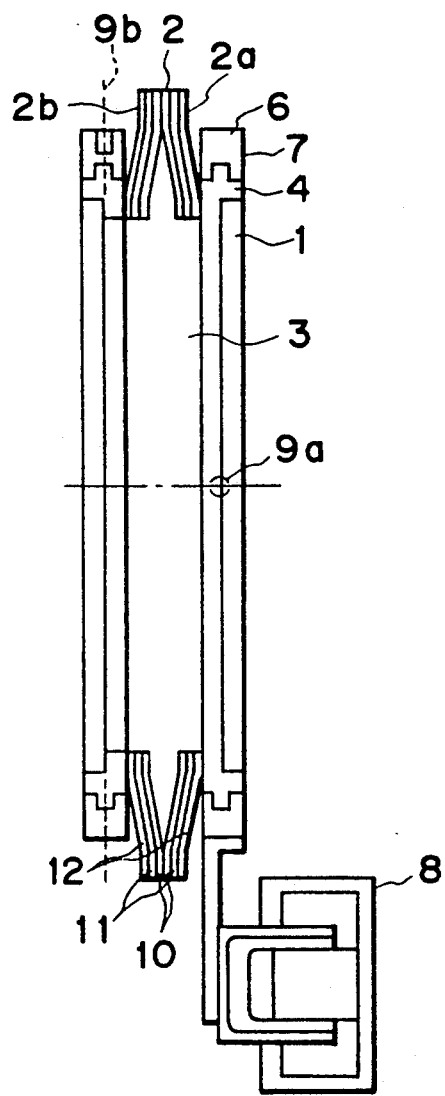
Figure 3:
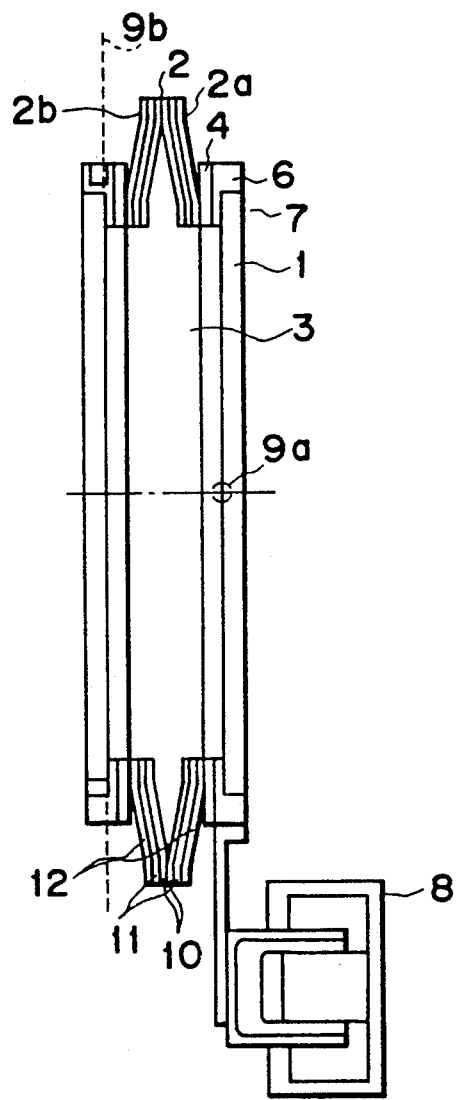

FIGS. 2 and 3 show sectional views of major portions of second and third embodiments of the present invention. The like elements to those shown in FIG. 1 are designated by the like numerals.

In the second embodiment shown in FIG. 2, the reinforcement member 6 is formed in an outer periphery of the support member 4. The support member 4 and the reinforcement member 6 are molded and composited by the dichromatic molding method to form the composite member 7. The material of the support member 4 is linear low density polyethylene, and the material of the reinforcement member 6 is glass fiber added polycarbonate.

In the present embodiment, the manufacturing process of the composite member 7 is simplified and the composite material 7 is thinner than that of the first embodiment. Further, the delay of response of the variable apex angle prism is substantially zero.

In the third embodiment shown in FIG. 3, the support member 4 and the reinforcement member 6 are formed by the insert molding method and they are composited to form the composite member 7. The material of the support member 4 is linear low density polyethylene and the material of the reinforcement member 6 is aluminum.

In the present embodiment, a radial size of the composite member 7 is smaller than that of the first embodiment and the diameter of the variable apex angle prism can be reduced. The delay of response of the variable apex angle prism is substantially zero.

In accordance with the present invention, the reinforcement member made of a harder material than that of the support member is formed at a portion of the support member, which supports the parallel-plane plates, and the driving force to vary the apex angle of the variable apex angle prism is applied through the reinforcement member so that the apex angle of the prism can be rapidly and readily varied to attain a high response optical device which is suitable to use in an image stabilizing optical system.

We claim:

1. An optical device comprising:
   a transparent and soft material;
   a pair of transparent plates for supporting said material;
   a frame that surrounds a periphery of each plate;
   a flexible connecting member for connecting said frames to define a space in which said transparent and soft material is filled;
   a reinforcement member formed in each of said frames that is harder than said frames; and
   means for applying a driving force to at least one of said frames directly through said reinforcement member.

2. An optical device according to claim 1 wherein the material of said connecting member which connects to said frames is same as the material of said frames.

3. An optical device according to claim 2 wherein said frames and said connecting member are connected by being thermally bonded.

4. An optical device according to claim 1 wherein said member is of ring shape.

5. An optical device according to claim 1 wherein said transparent and soft material comprises silicon oil.

6. An optical device according to claim 1 wherein said hard material is glass fiber added polycarbonate.

7. An optical device comprising:
   a pair of transparent parallel-plane plates;
   a support member for supporting each of said pair of parallel-plane plates;
   an optically transparent material held in a space defined by said pair of parallel-plane plates;

a deformable connecting member for connecting said pair of parallel-plane plates and for holding said optically transparent material in said space;

a reinforcement member made of a harder material than the material of said support member and formed adjacent to a portion of said support member; and drive means for applying a drive force to each of said pair of parallel-plane plates through said reinforcement member.

8. An optical device according to claim 7 wherein said reinforcement member comprises an end plane that is arranged on an outer periphery of said support member.

9. An optical device according to claim 7 wherein said support member and said connecting member are connected by being thermally bonded.

10. An optical device for varying an angle formed by a pair of transparent elements by a driving force of drive means, said device comprising:

a flexible connecting member;

a pair of composite members for respectively supporting said transparent elements, each composite member of said pair of composite members comprises both a support member to be connected with said flexible connecting element and a reinforcement member, which is made of a material harder than said support member, wherein at least one of said reinforcement members is both connected with one of said support members and said drive means; and a transparent member filled within a cell that is formed by said pair of transparent elements and said flexible connecting member.

11. An optical device according to claim 10, wherein said flexible connecting element and said support member are connected by thermal bonding.

12. An optical device according to claim 10, wherein said transparent member comprises silicone oil or modified silicone oil.

13. An optical device according to claim 10, wherein said reinforcement member comprises polyethylene telephthalate mixed with glass fiber.

14. An optical device according to claim 10, wherein said support member and said reinforcement member are connected by a dichromatic molding method.

15. An optical device according to claim 10, wherein said support member and said reinforce member are connected by an inserting molding method.

* * * * *

UNITED STATES PATENT AND TRADEMARK OFFICE
CERTIFICATE OF CORRECTION

PATENT NO. : 5,311,367
DATED : May 10, 1994
INVENTOR(S) : Kazuhiro OHKI, ET AL.

It is certified that error appears in the above-indentified patent and that said Letters Patent is hereby corrected as shown below:

COLUMN 3
    Line 15, "polystylene," should read --polystyrene,--; and
    Line 32, "forms" should read --form--.

COLUMN 4
    Line 51, "claim 1" should read --claim 1,--;
    Line 53, "claim 2" should read --claim 2,--;
    Line 56, "claim 1" should read --claim 1,--;
    Line 58, "claim 1" should read --claim 1,--; and
    Line 60, "claim 1" should read --claim 1,--.

UNITED STATES PATENT AND TRADEMARK OFFICE
CERTIFICATE OF CORRECTION

PATENT NO. : 5,311,367
DATED : May 10, 1994
INVENTOR(S) : Kazuhiro Ohki, et al

It is certified that error appears in the above-indentified patent and that said Letters Patent is hereby corrected as shown below:

Column 5, line 11, "claim 7" should read --claim 7,--; and
        line 15, "claim 7" should read --claim 7, --.
Column 6, line 23, "reinforce" should read --reinforcement --.

Signed and Sealed this

Eighth Day of November, 1994

Attest:

BRUCE LEHMAN

*Attesting Officer*    *Commissioner of Patents and Trademarks*